(12) United States Patent
Black

(10) Patent No.: US 6,970,583 B2
(45) Date of Patent: Nov. 29, 2005

(54) IDENTITY AUTHENTICATION DEVICE

(76) Inventor: Gerald R. Black, 30590 Southfield Rd. #160, Southfield, MI (US) 48076

( * ) Notice: Subject to any disclaimer, the term of this patent is extended or adjusted under 35 U.S.C. 154(b) by 424 days.

(21) Appl. No.: 09/865,756

(22) Filed: May 25, 2001

(65) Prior Publication Data

US 2001/0055411 A1 Dec. 27, 2001

Related U.S. Application Data (60) Provisional application No. 60/207,892, filed on May 25, 2000.

(51) Int. Cl.[7] ............................. G06K 9/00; H04K 1/00
(52) U.S. Cl. ...................................... 382/124; 713/186
(58) Field of Search ........................ 382/115–116, 124, 382/181, 186–188, 190, 313, 314; 713/186; 902/3; 283/69

(56) References Cited

U.S. PATENT DOCUMENTS

| | | | | |
|---|---|---|---|---|
| 5,103,486 A | * | 4/1992 | Grippi | ......................... 382/116 |
| 5,247,137 A | * | 9/1993 | Epperson | .................. 178/19.04 |
| 5,774,571 A | * | 6/1998 | Marshall | ...................... 382/119 |
| 5,838,306 A | * | 11/1998 | O'Connor et al. | .......... 345/163 |
| 5,859,420 A | * | 1/1999 | Borza | ...................... 250/208.1 |
| 5,991,431 A | * | 11/1999 | Borza et al. | ................. 382/127 |
| 6,728,881 B1 | * | 4/2004 | Karamchetty | ............... 713/186 |

OTHER PUBLICATIONS

Rogers "Biometrics" Biometric Digest, pp. 1-8, Jun. 1999.*

* cited by examiner

Primary Examiner—Daniel Miriam (57) ABSTRACT

An identity authentication device is stylus-shaped. A processor is disposed within the device. The stylus-shaped device includes a scanner-type device component for capturing within the processor memory a written signature generated by the stylus while the stylus is writing upon a surface. A fingerprint sensor is disposed within the grip of the stylus. The fingerprint sensor enables the capture of a digital signature of the writer at the same time that the written signature of the writer is captured. Once the identity of the writer has been authenticated by comparison against a reference print, the signature of the writer irrefutable. The device serves the same general purpose and can be used in lieu of a signature pad. The device is either attached to a surface or is portable and wireless.

3 Claims, 9 Drawing Sheets

FIGURE 1C
*prior art - signature pad*

| CARD PAN NO. |
|---|
| CUSTOMER'S BANK |
| CUSTOMER'S ACCOUNT NO. |

FIGURE 5A
CARD MEMORY FOR USE
WITH TETHERED PEN

| SMART PEN NO. |
|---|
| CUSTOMER'S ACCOUNT NO. |
| CUSTOMER'S BANK |
| REFERENCE PRINT |

FIGURE 5B
WIRELESS
SMART PEN MEMORY

| CARD PAN NO. |
|---|
| CUSTOMER NAME |
| ADDRESS |
| PHONE NUMBER |
| ACCOUNT BALANCE |
| REFERENCE PRINT |

FIGURE 6A
CUSTOMER RECORD MEMORY
FOR USE WITH TETHERED PEN

| SMART PEN NO. |
|---|
| CUSTOMER NAME |
| ADDRESS |
| PHONE NUMBER |
| ACCOUNT BALANCE |

FIGURE 6B
CUSTOMER RECORD MEMORY
FOR USE WITH WIRELESS
SMART PEN

FIGURE 7
Anoto text capture stylus

FIGURE 8
C-pen with a scanner

IDENTITY AUTHENTICATION DEVICE

This application claims the benefit of Provisional Application No. 60/207,892, filed May 25, 2000.

FIELD OF THE INVENTION

The invention relates generally to various systems for verifying the identification of a person, and more particularly, to a stylus-shaped device that captures text generated and enables confirmation of the identity of the writer.

BACKGROUND OF THE INVENTION

Many identification systems are known in the art. In some cases, a photograph of a subject or his fingerprint pattern is affixed to an identification card. In other approaches, various methods are employed for storing image or password information in a magnetic stripe or in an optically encoded image or pattern, which is physically part of the identification card. Still other approaches utilize a "smart card" having its own semiconductor memory capability for information storage.

- U.S. Pat. No. 6,175,922 (Wang) discloses an electronic transaction system for completing a transaction request at a point-of-sale terminal using a portable electronic authorization device carried by a user. The device first receives digital data representing the transaction request. The electronic authorization device provides information to the user regarding an ability to approve the transaction request. When the user approves the transaction, the electronic authorization device receives additional data representing the electronic service authorization token.
- U.S. Pat. No. 5,706,349 (Aditham et at.) Discloses a system for authenticating remote users in a distributed environment. A token is initially issued to a remote user once a security mechanism initially can determine that the remote user is who he claims to be. Thereafter, a connection between a remote user and an application server requires the application server to first verify that a token associated with a connection request was issued by the security mechanism. If the token associated with the connection call was issued by the security mechanism, the remote user is connected to the application server.
- U.S. Pat. No. 6,202,055 (Houvener, et al.) Discloses a system for processing a financial instrument other than cash. A customer at a point of identification terminal initially submits the instrument—perhaps a check. The checking account number is communicated to a remote database containing digital photographic images of authorized users of checking accounts. The remote database is searched and any digital photographic images associated with the checking account number are transmitted to the point of identification terminal. The images are displayed and compared to the physical appearance of the customer. The on-site employee then submits determines if at least one of the displayed digital matches the appearance of the person initiating the transaction. The transaction data is then stored as a transaction record.

While a written signature is still regarded as the preferred way for a person to convey approval and a legal commitment, there still remains a need to confirm absolutely that can assure that the person signing is the person authorized to make a commitment.

Also, text-capture devices having the general shape of a stylus are now commercially available. These devices track the movement of the point of a wireless pen to recreate any text that is written upon any surface. Authentication of the writer's identity is needed to enable only the person who generated the text to have access to the text.

What is needed is a system that captures a digital signature (which is the international standard of identification) at the same time that the electronic signature (the written text) is captured, the combined signature being irrefutable.

SUMMARY OF THE INVENTION

The system of the present invention addresses these needs. The identity authentication device is stylus-shaped. A processor is disposed within the device. The stylus-shaped device includes a scanner-type device component for capturing within the processor memory a written signature generated by the stylus while the stylus is writing upon a surface. A fingerprint sensor is disposed within the grip of the stylus. The fingerprint sensor enables the capture of a digital signature of the writer at the same time that the written signature of the writer is captured. Once the identity of the writer has been authenticated by comparison against a reference print, the signature of the writer irrefutable. The device serves the same general purpose and can be used in lieu of a signature pad. The device is either attached to a surface or is portable and wireless.

Text capture involves reconstructing text generated with a pen on any surface based upon the motion and position of the pen. This is in contrast to data capture by preserving the images inscribed upon the digital surface. As a result of miniaturization, the computer input device is a handheld computer. The pen transforms the handwriting of the writer into text for display on a computer screen for editing or printout. The main attraction of these pens is for users who usually take notes by hand while traveling and type them up when returning to the office. Also, people can use the pen in the office and skip the step of typing up their notes.

Mobile computing applications: mobile computing extends the reach of computers as users must be connected to local networks all the time wherever they go. Also, users want to take with them the same tools that they have at their desks. The biometric pen device of the present invention ensures the integrity of all data and that data access is easy, transparent, reliable, and secure. In text capture, movement of the point of a pen is captured and used to recreate any text that is written upon any surface. Authentication of the writer's identity is needed to decipher the writing and to secure data access.

The identity authentication system of the present invention devices may be used wherever there is a need for personal identity authentication and signature capture. Applications are everywhere and include:

- financial transactions (at POS terminals and off-site)
- mobile computing networks
- controlled environments for data access and entry (e.g. Hospitals and banks)

The identity authentication device of the present invention is compatible with both card-based and pen-based systems.

- For use with a card at a POS terminal—the pen is attached to a counter and used by many people. A reference image is pre-registered and stored inside the card carried by each user.
- For use with a pen-based computer the reference image is pre-registered and stored inside the pen-based computer or the host computer.

Pen-based signature verification systems are now appearing at POS terminals. These systems use signature as the basis to confirm identity. However, signature has proven to be unreliable and is affected by mood, stress, fatigue, time of day, and many other factors. Another disadvantage of signature verification systems is that a thief is provided with a blueprint for access once a copy of the signature is obtained.

The identity authentication system of the present invention authenticates writer identity at point-of-sale transactions using the ultimate in biometric technologies. Identity is authenticated against an encrypted reference image while the pen is being used. A biometric sensor is positioned inside the pen grip.

The identity authentication system of the present invention is user-friendly, simple, fast, and nonobtrusive, actually discourages fraud, and positively confirms the identity of the writer. The identity authentication system of the present invention is compatible with existing POS terminals. The identity authentication system of the present invention requires no additional hardware except for the pen. The identity authentication system of the present invention is compatible with credit card and smart card use. The logic is basic—either there is a match and the transaction proceeds, or there is no match and the transaction is blocked.

The identity authentication system of the present invention verifies writer identity independent of the content of the writing, and provides signature capture to prevent subsequent repudiation. The certainty of the identity authentication system of the present invention verification enables owners of the wireless pens to eventually make credit cards optional.

As used herein, the term "smart pen" refers to a stylus with a processor therein for capturing the writing of the customer within the processor in the stylus as such writing is generated. The smart pen can also be used to capture the signature of the payee. As such, the smart pen can replace a conventional signature pad.

Wherever the customer submits written identifiers, or there is information that needs to be captured from the writing submitted by the customer (account number, withdrawal or deposit) the smart pen may be used. Wherever a smart-pen is needed, a scanner-type smart pen is preferred since it captures all writing on the document (not just the writing submitted by the customer).

For use in commercial transactions at a POS terminal, a customer registers selecting a customer account that is to be used for payment. The customer also submits a digital signature for reference purposes—preferably, a fingerprint. The customer is then issued a transponder that links the customer to the customer account and to the reference digital signature. When the customer is at the point-of-sale terminal for making payment, an interrogator disposed at the point-of-sale terminal transmits a radio signal requesting identity verification. The wireless transponder submits data to the interrogator. Thereafter, when the customer uses a stylus to submit written data (such as a signature), a sensor in the stylus makes incidental capture of biometric data that enables the interrogator to confirm customer identity. Similarly, the system can be used to confirm identity when the customer wants to cash a personal check.

Positioned at the center of the process is a stylus with any of a number of biometric or with one or more metric sensors, that enable an incidental capture of data relative to identity verification while the stylus is being used. The identity verification processes of the present invention can be used at POS terminals, in various controlled environments, to access a computer network, in applications involving pen-based computers and smart-pens, for e-commerce, conventional writing implements, and multi-purpose writing implements.

While the systems set forth herein are described in conjunction with POS terminals for purposes of illustration, it is understood that the principles set forth herein are all applicable to a broad range of other activities where a writing or signature are required or preferred, such as internet and intranet commerce, access control, government activities (voting, drivers' registration, receipt of government benefits) and for use in controlled environments (such as hospitals, and banks).

PCT Application no. PCT/US99/17900 entitled "Identification Confirmation System" filed on Apr. 7, 1999; U.S. patent application Ser. No. 09/490,687, entitled "writing implement and identity verification systems" filed on Jan. 24, 2000; U.S. patent application Ser. No. 09/535,411, entitled "Method for Identity Verification" filed on Mar. 20, 2000; and pct application no. PCT/US00/19652 entitled "identity authentication system and method" filed Jul. 18, 2000 by the applicant disclose various systems and configurations for identity authentication using a combination of pen-based and card-based systems. As depicted herein, the systems include a card, a stylus including one or more fingerprint sensors for use with a signature pad. In one embodiment, the system comprises a stylus, a card with enhanced storage capacity, and a signature pad.

The stylus includes one or more fingerprint sensor that captures an image of a finger of the customer when the stylus is grasped. While fingerprint sensors are used herein for purposes of illustration it is expressly understood that the principles of this invention are also applicable to sensing of DNA and other biotech properties—that involve cell capture or cell analysis sensors. During routine usage of the stylus, the sensor captures the data necessary to compare with the digital signature to determine identity verification.

As used herein unless the context indicates otherwise, a "stylus" is any device that is compatible with either the hand or finger of the user for purposes of making a marking on an essentially flat surface. The flat surface may be a digital surface or a piece of paper. While the drawings depict a conventional shape of a stylus, other shapes and designs are also included within the scope of the present invention such as any attachment or thimble-like device for a finger or any implement that can be held with a hand for such purpose. The stylus may or may not include an ink cartridge. Also, as used herein unless the context suggests otherwise, the term "fingerprint" refers to either the print of the thumb, index finger, or any other finger.

For a more complete understanding of the identity authentication device of the present invention, reference is made to the following detailed description and accompanying drawings in which the presently preferred embodiments of the invention are shown by way of example. As the invention may be embodied in many forms without departing from spirit of essential characteristics thereof, it is expressly understood that the drawings are for purposes of illustration and description only, and are not intended as a definition of the limits of the invention. Throughout the description, like reference numbers refer to the same component throughout the several views.

DETAILED DESCRIPTION OF THE PREFERRED EMBODIMENTS

Figure 1A:
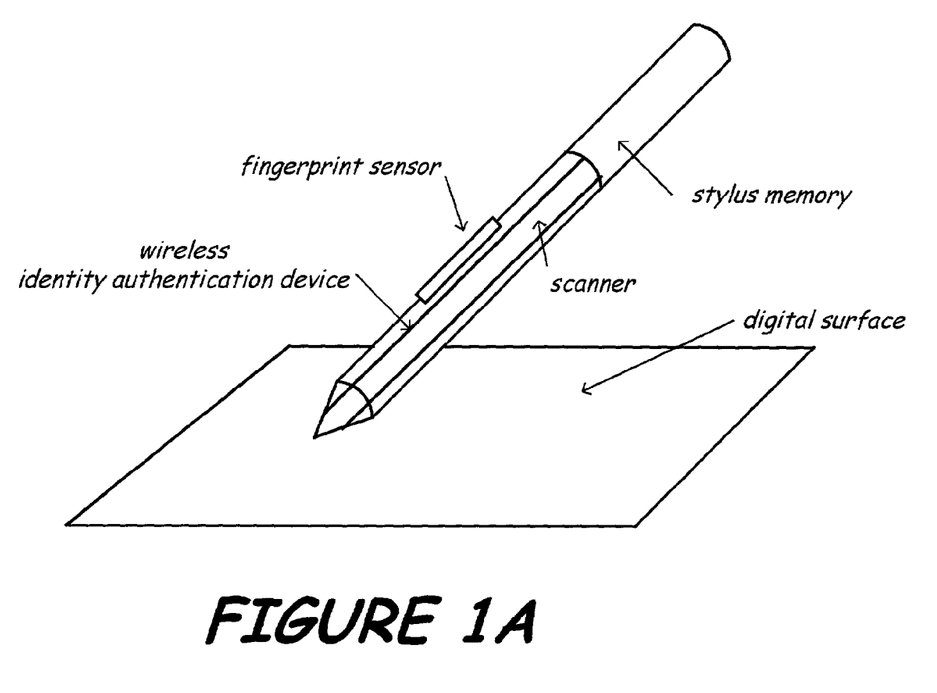
FIG. 1A discloses a first preferred embodiment of the identity authentication device of the present invention, the device being portable and wireless.
Figure 1B:
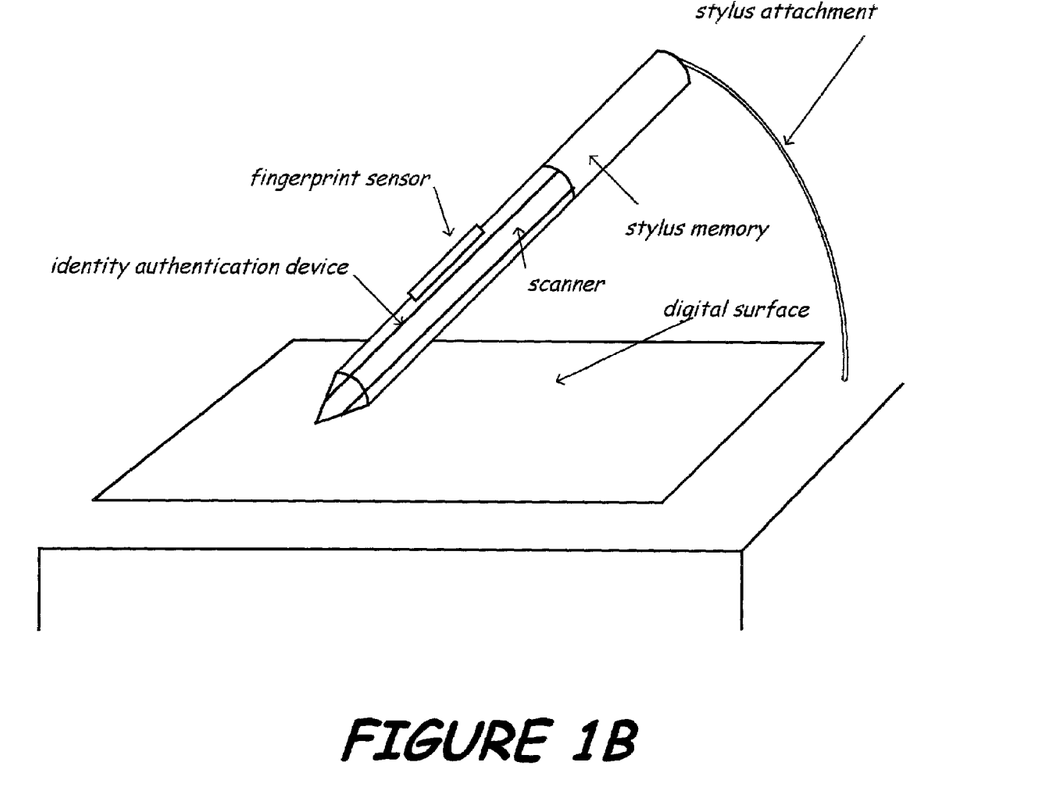
FIG. 1B discloses a first preferred embodiment of the identity authentication device of the present invention, the device being attached to a counter.
Figure 1C:
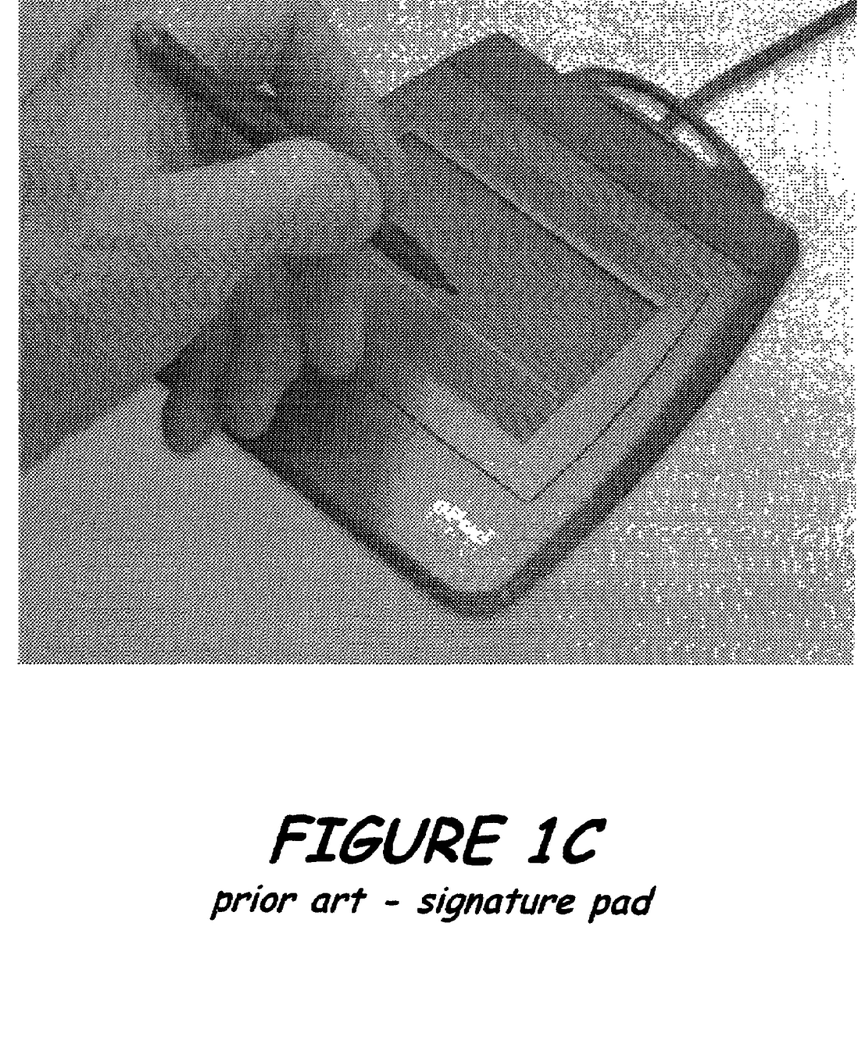
FIG. 1C discloses a conventional signature pad of the prior art.

Referring now to the drawings, as shown in FIGS. 1A and 1B, the identity authentication device of the present invention is stylus-shaped. A processor is disposed within the device. The stylus-shaped device includes a scanner-type device component for capturing within the processor memory a written signature generated by the stylus while the stylus is writing upon a surface. A fingerprint sensor is disposed within the grip of the stylus. The fingerprint sensor enables the capture of a digital signature of the writer at the same time that the written signature of the writer is captured. Once the identity of the writer has been authenticated by comparison against a reference print, the signature of the writer irrefutable. The device serves the same general purpose and can be used in lieu of a signature pad. The device is either attached to a surface or is portable and wireless.

The smart-pen includes a processor with memory disposed therewithin. The smart-pen is a handheld pen-shaped device that captures text as the text is generated. The smart-pen can replace a signature pad in the identity confirmation system of the present invention. These smart-pens are generally wireless. Several such devices are commercially available—for example Anoto, and n-scribe. The smart-pens capture text written on any surface (a napkin, a tablecloth, or a tablet). The smart-pen is thereafter linked to a conventional computer where the text is downloaded into the user's file—for editing purposes or for printing a hard copy of the captured data.

Figures 7, 8:
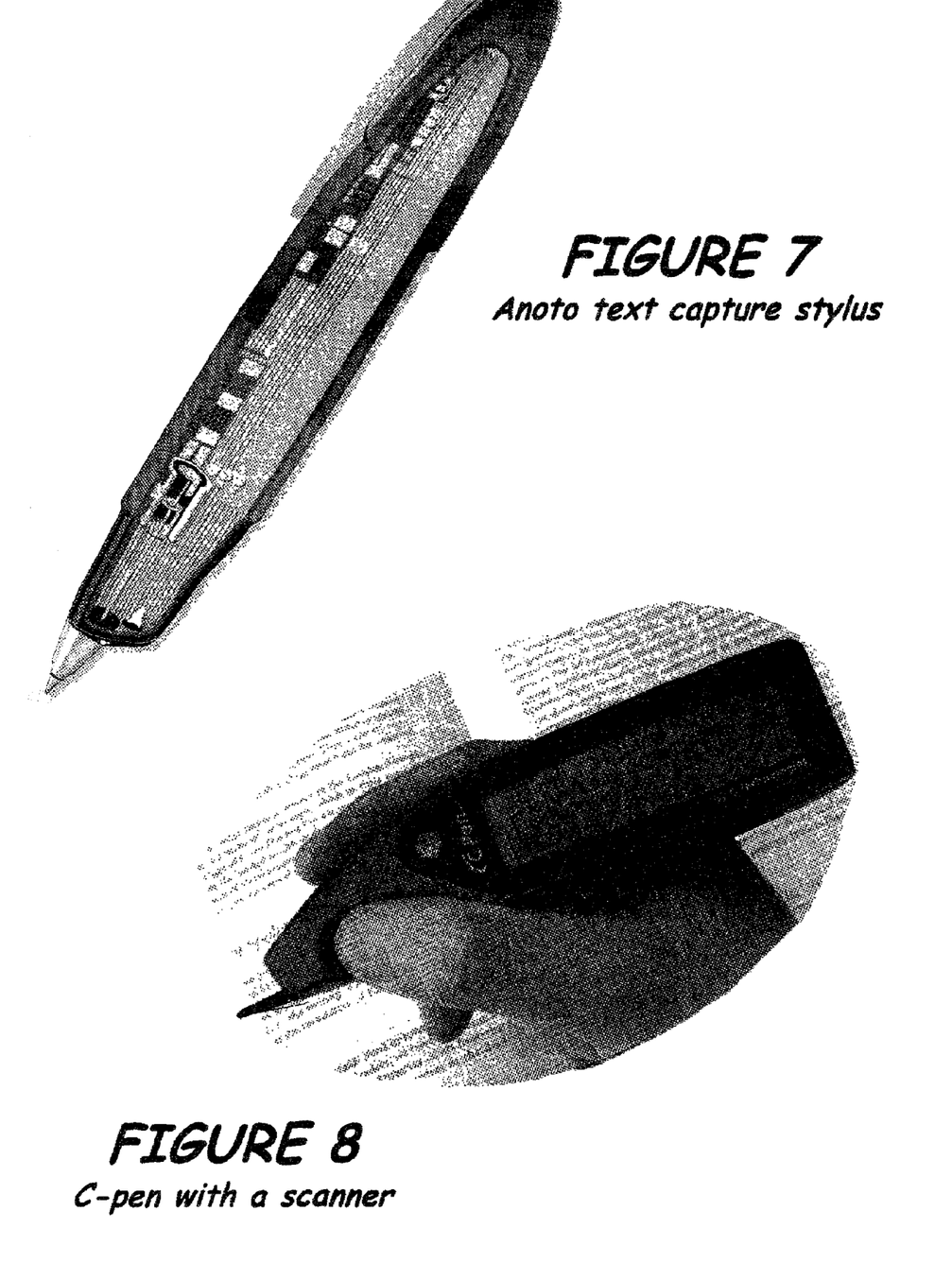
FIG. 7 discloses an Anoto text-capture stylus, the stylus including a camera.
FIG. 8 discloses a C-pen that includes an optical scanner.

The Anoto smart-pen is shown in FIG. 7—the smart-pen including a fingerprint sensor. The main parts of the Anoto smart-pen are a digital camera, an image-processing unit and a Bluetooth radio transceiver. The smart-pen also contains an ink cartridge so that the actual writing or picture can be viewed as drawn. The smart-pen has no buttons or displays, and looks and feels like an ordinary ballpoint pen. The Anoto input device is just a piece of ordinary paper on which a proprietary pattern has been printed. For the eye this pattern is perceived as a slightly off-white color. A very small portion of the pattern uniquely defines the position on the full pattern, which encompasses an area exceeding 1.8 million square miles. The dots of the written pattern are illuminated by infrared light, making them visible for the digital camera. Digital snapshots are taken of the pattern. The ink from the smart-pen is invisible to the camera, so that the writing does not degrade the pattern. The image processor calculates, in real-time, the exact position in the entire pattern. During image processing, snapshots are compared and information about how the smart-pen is held is also gathered and stored. All the data from the image processor is packaged and loaded into the smart-pen memory, which can store several fully written pages. The information is transmitted by the Bluetooth transceiver, either directly to a processor, or forwarded via a relay device (e.g. mobile phone, personal computer or handheld device) to a Look-up Service. From here some information is forwarded for further processing elsewhere. A force-sensing resistor measures the tip force applied to the smart-pen.

The n-scribe smart-pen comprises a ballpoint pen and cover. To use the smart-pen, the cover is removed and clipped to any paper, notebook or other flat surface that is writing on—no special paper is required. During the writing, the smart-pen emits infrared light that is received by the two infrared sensors in the cover of the smart-pen. Together they work like the guidance system in a cruise missile, constantly adjusting and transcribing the location of the smart-pen in relationship to the two fixed points. As the smart-pen moves, the information is constantly updated in real time, tracking the movements of the tip of the smart-pen. Everything is captured—drawings, writings, numbers; whatever is written with the smart-pen is stored in pen memory. And because the smart-pen is both a traditional ink pen and an electronic transmitter, the writing can be seen while the pen cover is capturing the data for electronic storage. The smart-pen looks and writes like a regular pen, yet lets users transmit handwritten information over cellular phones or other Internet-ready appliances to the Web, where the transmission can be distributed as an instant message, e-mail or fax, or stored for future reference. There is no need to re-key data, and no special paper or pads are required. The smart-pen can be packaged for use as an accessory to most popular electronic products and services, including cell phones, hand-held computers, desktops and laptop computers, and other electronic portable devices.

Another smart-pen stylus for use with the identity confirmation system of the present invention is a modified C-PEN. C-PEN is a pen-shaped text-capture device that reads and captures text into a processor mounted within the device. By mounting a stylus (either with or without the ink cartridge) this device can also be used as a smart-pen and replace a signature pad—see FIG. 8. The device allows the writer to write characters by using the smart-pen like an ordinary ballpoint pen. The smart-pen can follow its own movement over a surface and recognize the movement as a letter or numeral.

Figure 2A:
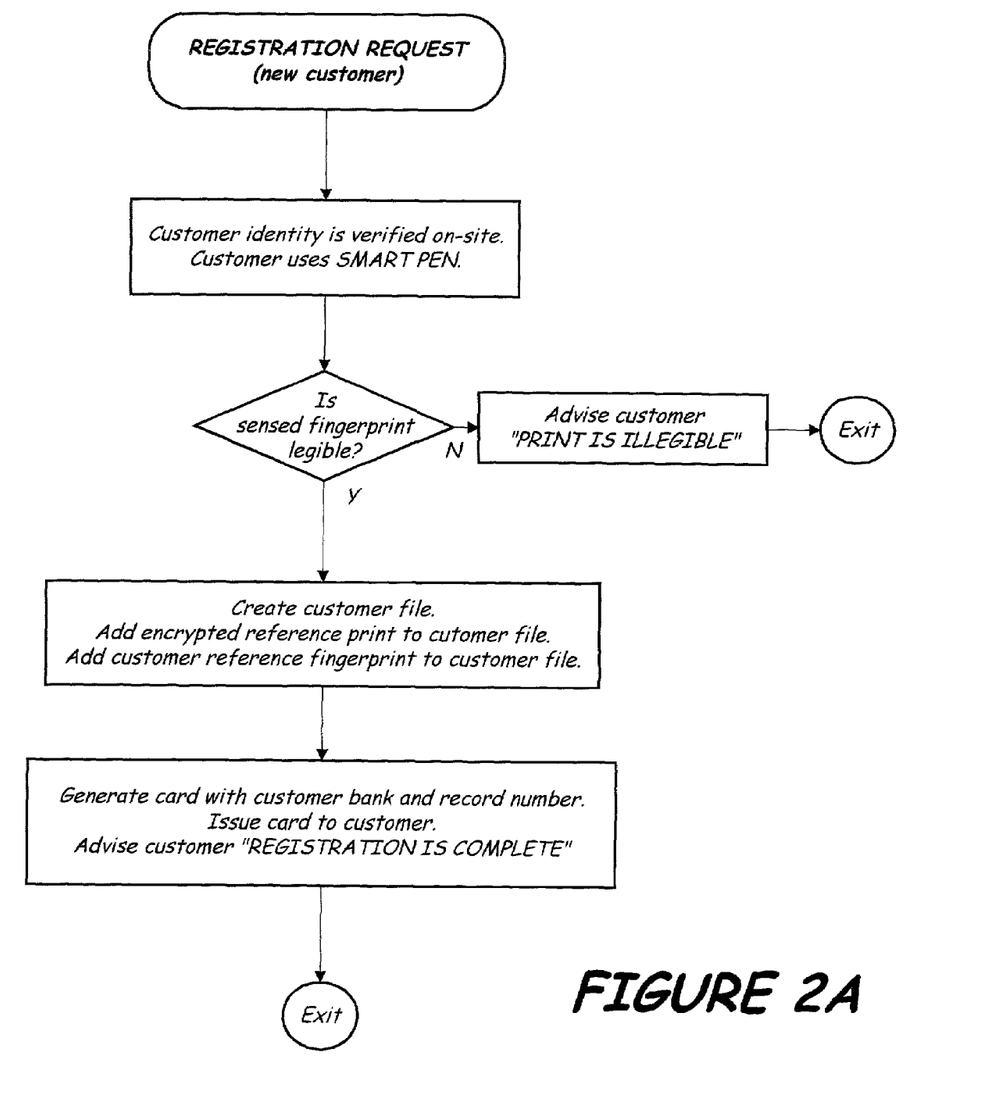
FIG. 2A discloses a simplified logic diagram of a method of enrolling a new customer into the identity authentication system of FIG. 1a, 1b, or 1c.
Figure 2B:
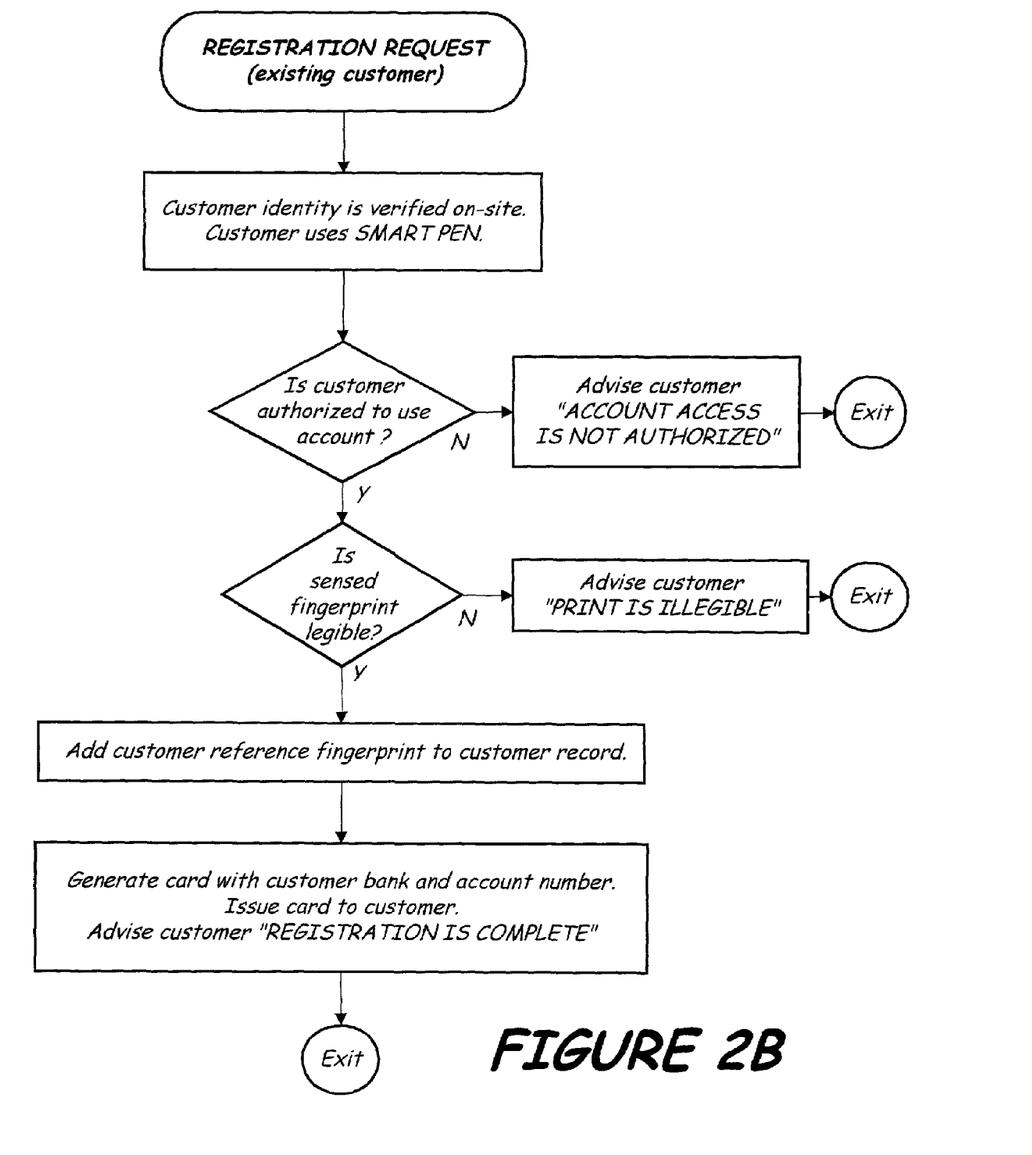
FIG. 2B discloses a simplified logic diagram of a method of enrolling an existing customer into the identity authentication system of FIG. 1A.

FIGS. 2A and 2B disclose simplified methods for registration for new and existing customers, respectively. The primary difference in the two methods is that for the new customer, the customer record must be created. For the existing customer, the customer record is already in existence but a confirmation check is needed to confirm that the customer has authorized access to the account.

The smart pen can be attached to a POS terminal, attached to a pen-based computer, or a signature pad. In addition, the stylus can be wireless, whereby a transponder is incorporated into the wireless stylus. Each stylus also includes one or more fingerprint sensors that capture an image of a finger of the customer when the stylus is grasped.

Figure 3:
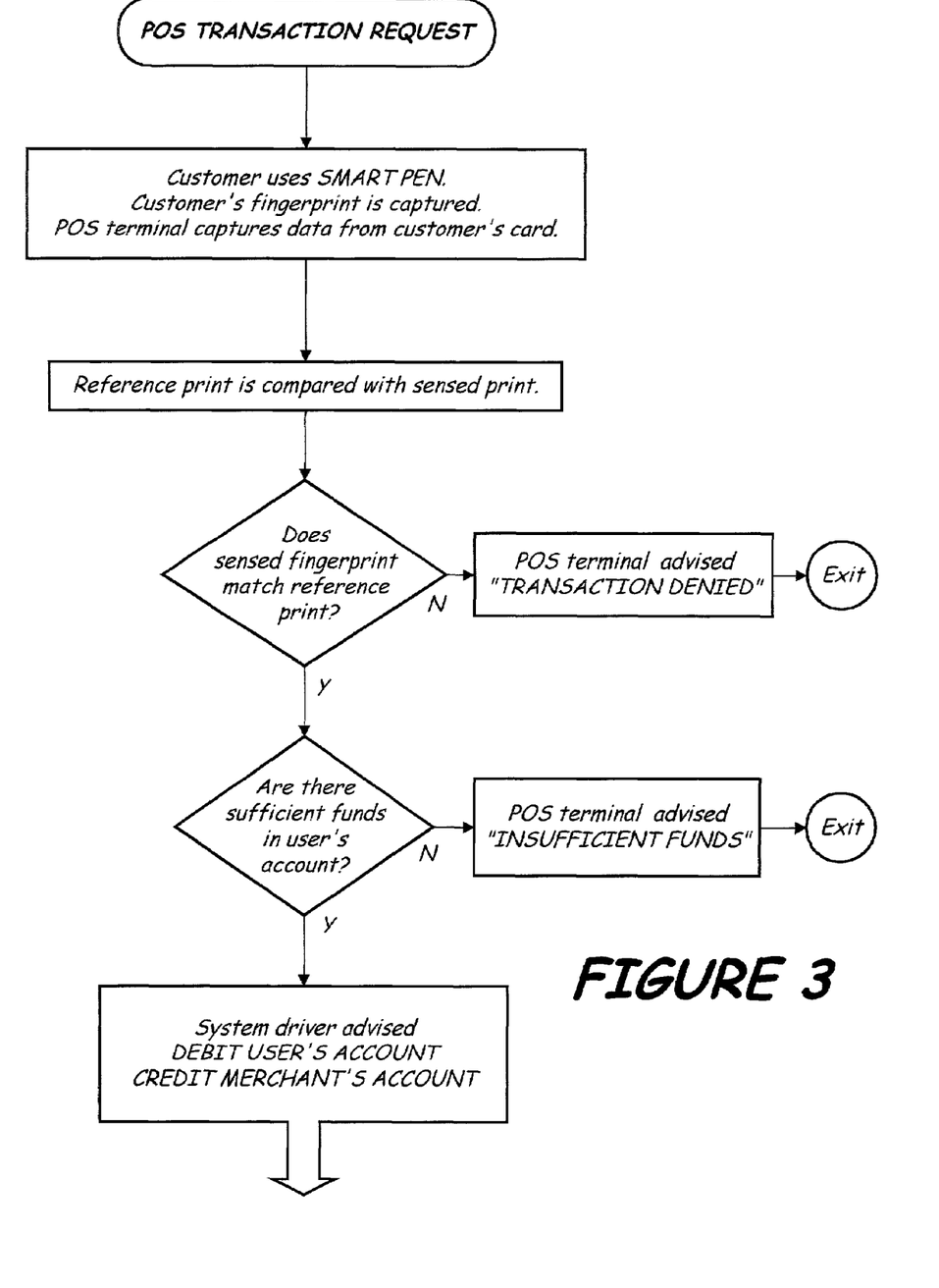
FIG. 3 discloses a simplified logic diagram for one method of making a purchase at a POS terminal using the wireless customer identity verification system of FIG. 5.
Figure 4:
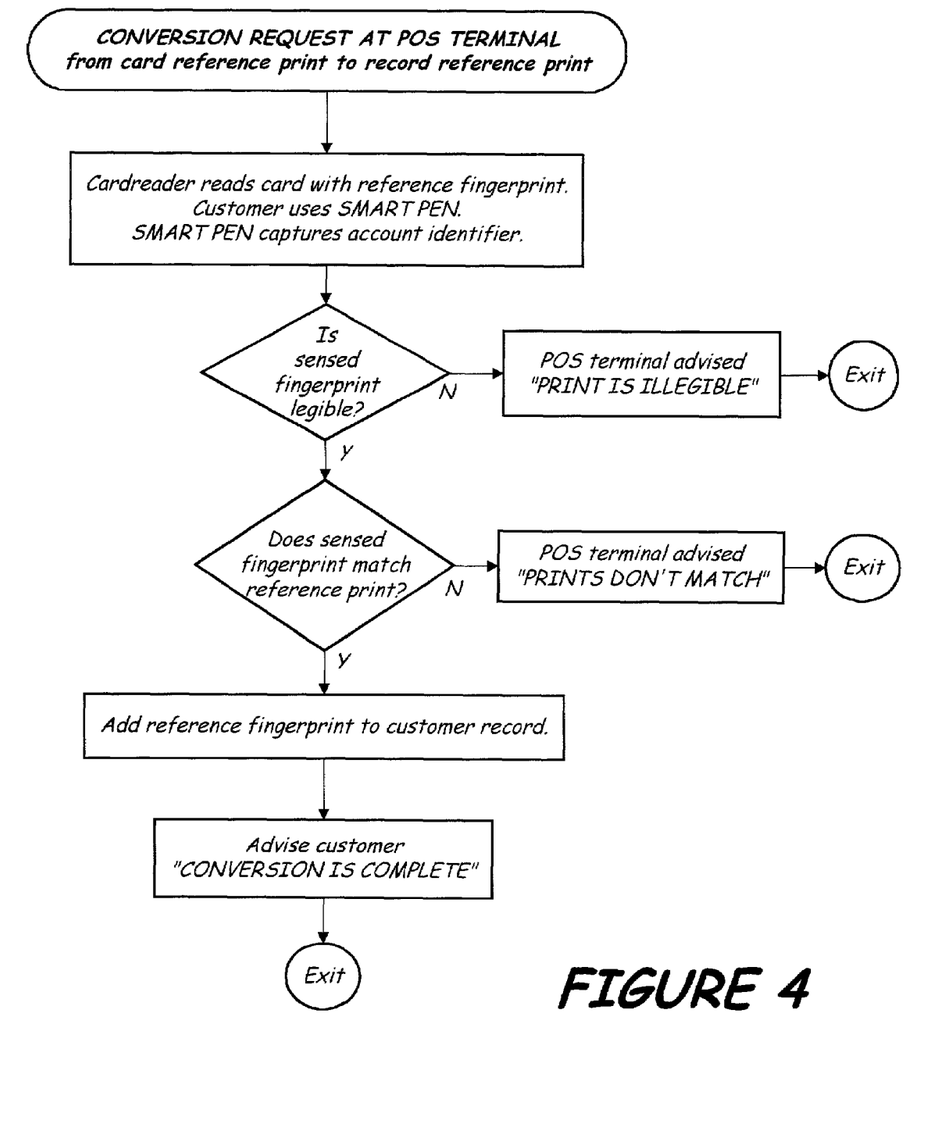
FIG. 4 discloses a simplified logic diagram for processing a conversion request at POS terminal to enable conversion from a card reference fingerprint to a record reference fingerprint for the identity verification device of the present invention.
Figure 5A:
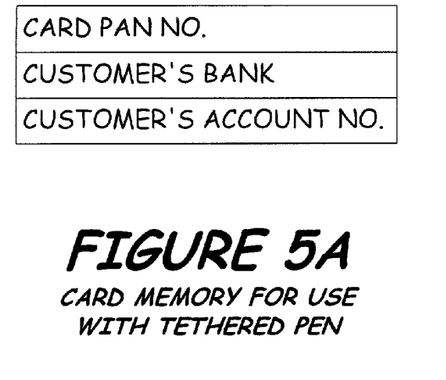
FIG. 5A discloses a simplified example of card memory for use with a tethered identity authentication device of the present invention.
Figure 5B:
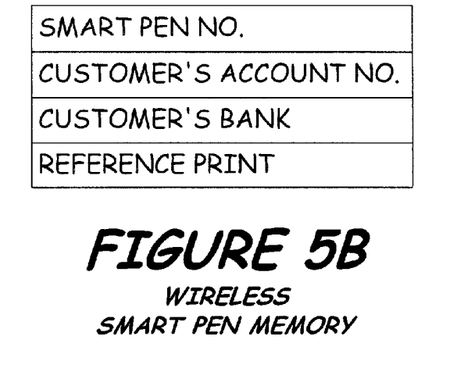
FIG. 5B discloses a simplified example of memory for a wireless embodiment of the identity authentication device of the present invention.
Figure 6A:
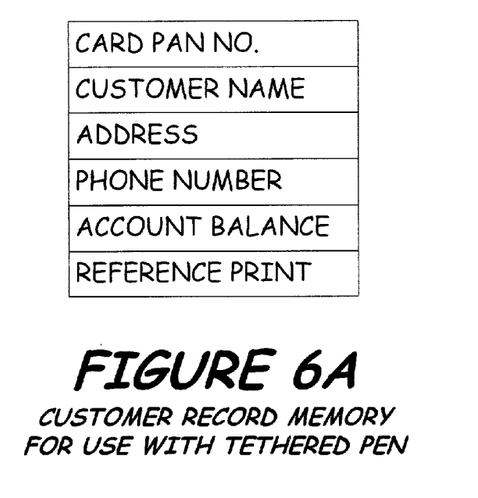
FIG. 6A discloses a simplified example of a customer bank record for use with the data record of FIG. 5A for the tethered identity verification device of the present invention shown in FIG. 1B.
Figure 6B:
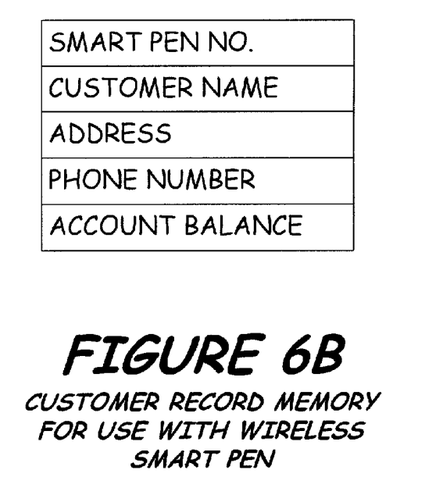
FIG. 6B discloses a simplified customer example of a bank record for use with the data record of FIG. 5B for the wireless identity verification device of the present invention shown in FIG. 1A.

The transponder responds to a radio signal by emitting its own radio signal. Each transponder is tagged with a unique serial number. That serial number can be linked with a credit or debit account. A typical sale may proceed as follows (see FIG. 3). The customer selects goods and proceeds to a POS terminal. The POS terminal indicates that the transaction will be paid through a transponder. An interrogator disposed at the POS terminal collects data from the transponder. A tight advises the customer that the payment has been accepted. Payment is made instantly from the customer's registered account.

Another preferred embodiment of the identity verification system of the present invention is depicted in FIGS. 2A and 2B. For example in a branch office of a bank—a controlled environment, the pens of the present invention are placed at all tellers' windows, all ATMs, and all officers' desks. New customers are given a debit/check/ATM card upon filling out an application. The customer uses a pen similar to the pens at the tellers' windows. The customer's reference print is captured during registration, preferably within a branch office of the bank and electronic fingerprint image that is encrypted is stored in the customer's bank record. Such cards can actually be issued and distributed to customers once registration is completed, much the same as hotels use to issue room keys upon registration—the cards are pre-printed and certain data is loaded onto the card prior to issuance.

The use of this transponder as a component of the pen-based verification system of the present invention enables the transponder to be compatible with both card-based and cardless systems. In the card-based system, the device is swiped through a cardreader at the POS terminal—and the customer signs her name using the fingerprint stylus. The reference fingerprint image is stored in the smart card/transponder device, which is also where the matching of the sensed print (from the pen) is compared with the reference fingerprint image. This embodiment enabling compatibility with both cardreaders and transponders also is key in enabling a transition to a cardless system.

When wireless devices are used, system security becomes even more of a concern, since an integral part of the system, is not attached to the system, but rather is portable and carried by a customer. When the reference print is stored inside the identity authentication device of FIG. 1A and is carried by the customer, either of the following technologies may also be employed:

U.S. Pat. No. 5,619,025 (Hickman, et al.) Discloses a method for tamper-proof identification using photo refractive crystals. The method for document authentication exploits a temporally variable physical process to generate a reproducible effect that cannot be copied. A document such as a credit card is provided with a spot or stripe that incorporates at least one, and preferably a large plurality of photo refractive crystals arrayed in a random manner. The document authenticating apparatus includes a coherent light source such as a diode laser to illuminate the photo refractive crystals, and a photosensor to receive light scattered from the photo refractive crystals. The random distribution and orientation of photo refractive crystals comprises a unique characteristic for each card or document, and this characteristic is not based on any assigned number or code. The response of photo refractive crystals to the coherent illumination comprises a time-varying characteristic that is dependent upon the intensity and temporal nature of the illumination itself. Input to the laser illuminator may be varied to elicit differing responses from the photo refractive crystals, and this factor may be very difficult for a counterfeiter to ascertain. Also, for any given illumination intensity or temporal pattern, the image received by the photosensor varies with time. The time at which the photosensor signal is sampled to obtain an identifying image may also be varied, thereby further compounding the difficulty for a counterfeiter to overcome. A large number of "snapshots" of the time-varying image of the document is electronically captured, digitized, and stored in an electronic media. The photosensor signal is compared to the stored data; a match indicates a valid document, and no match indicates an invalid or unauthorized document. The image recognition process can be enhanced by comparing the rate of change in a sequence of images elicited by the laser illuminator.

U.S. Pat. No. 5,834,748 (Litman) discloses a card that includes magnetic particles and is difficult to counterfeit. The signal strength, period, amplitude and/or alignment of the magnetic field may be read as coded information by a magnetic reading head. The encoding of this information can be made increasingly difficult to imitate or forge by varying parameters within these (and other) mechanically readable inscriptions. The apparatus readable (mechanically readable) security means to prevent forgery of identification cards, (including the new smart cards with readable chips therein) and pens. The security of the pens is enhanced by the implementation of a mechanically readable security system, which includes a mechanically readable magnetic marking embedded in the transactional item. The marking also may be visually notable or readable, but it at least must be readable by a reading head capable of reading the passage of a magnetic material by the head. The marking is preferably in the form of at least two magnetic filaments or strips and preferably includes a multiple number of filaments of differing coerciveness, magnetic field strength, magnetic field alignment, size or spacing so that when the pen is passed at a defined and preferably constant speed through the reading device, approval will be given only when the proper signal is provided by the ordered array of appropriate magnetic elements in the pen.

Registration can also occur without the pen, but rather with a fingerprint that captures essentially a complete fingerprint of the finger for references purposes. Subsequently, when the pen is used, the partial print is compared to the complete fingerprint for matching purposes.

The fingerprint sensors of choice are either of the following:

The FingerTIP™ sensor from Infineon enables the integration of a miniature fingerprint sensor into a wide variety of end-products including PCs, notebook computers, handheld devices, set-top boxes, ATM's, point of sale terminals, ticketing kiosks, building access systems, or any other application that would benefit from replacing PIN and password identification with biometric-based verification. The chip is compact, reliable and robust enough to convert a previously exotic technology-biometric user ID into an everyday reality. The FingerTIP chip is a small (18 mm×21 mm×1.5 mm) IC embedding a 288×224 pixel contact sensor array that images the lines and ridges of a human fingerprint when a user touches the device. Each pixel has an 8-bit data depth, enabling evaluation of subtle gradations (256 shades of gray) of a fingertip and their translation into a set of indices—the key identifying features of an individual fingerprint. Imaging and data transfer of an impression takes only 100 milliseconds.

STMicroelectronics has developed a fingerprint sensor of substantially the same size as the Infineon sensor and that use capacitive-sensor-array technology; building silicon IC's containing an array of sensor plates. ST's TouchChip technology uses a capacitive sensing technique to capture, in less than one tenth of a second, a high-resolution image of a fingerprint when the finger is applied directly to the chip surface. The output of the chip is a digital representation of the fingerprint, which can be processed by the algorithms developed by 5AGEM, which immediately confirm or invalidate the recognition of pre-identified persons and then be further processed by application-dependent software.

The devices of the present invention are also useful in any hotel to improve security involving on-site charging to a room. The principles of this invention are applicable to controlled environments other than resorts, hotel-casinos, hotels, and casinos. As used herein, unless the context suggests otherwise, a controlled environment is a community of people that: (1) requires registration to become a part of the community; and (2) where the purchase of goods or services occurs. Some examples of controlled environments include: hotels-resorts, luxury cruise liners, airports, banks, racetracks, bowling alleys, theme parks, hospitals, college campuses and public/private schools, military bases, hotel-casinos, sports complexes, shopping malls, and prisons. Once enrolled into the cardless transaction system of the present invention, any guest upon registration with the hotel complex has full and complete access to any amenity within the complex, at anytime, without carrying on his/her user anything other than biometric identification that is inherent in his/her being. As used herein a "controlled environment" does not require a single physical structure, but rather also includes a network of related activities administered by a centralized driver. Some examples of these type controlled environments include a bank and its customers, a regional of drugstores, health club facilities, restaurants, or beauty salons and their customers.

Examples include:

Hotels-resorts—the key provides access to the guest room and other private suites and for guest tracking while the cash-alternative instrument is used for all on-site purchases.

Luxury cruise liners—the key provides access to the guest room while the cash-alternative instrument is used as a method of payment for all on-site purchases.

Airports—the key provides access to private clubs for preferred passengers and security access for airport security personnel while the cash-alternative instrument is used as a method of payment for tickets, food, car rentals, etc.

Hotel-casinos—the key provides access to the guest room while the cash-alternative instrument is used for all purchases within the complex (particularly useful when chips and cash are not used for gaming—player tracking).

Racetracks, bowling alleys, pool halls—key is used for access to the facility and private rooms on site while the cash-alternative instrument is used as a method of payment for on-site purchases.

Theme parks—the key provides gate entry and entry to any private facilities within the park while the cash-alternative instrument is used as a method of payment within the park.

Hospitals—the key provides access to the patient rooms (private and semi-private) while the cash-alternative instrument is used for purposes of identification for treatment purposes and patient tracking and for purchases. The key can be used by physicians, nurses, and administrative personnel for access to secure areas, parking, access to patient records, and the cash-alternative instrument can be used for on-site purchases.

College campuses and public/private schools—the key provides access to the dorm and individual rooms and classrooms and for purposes of identification while the cash-alternative instrument is used for student aid requests, scholarships, and purchases on campus (cash-alternative instrument also used for identification for medical treatment).

Military bases—the key is used for identification for access into the base, secure areas within the base, and individual rooms and tracking while the cash-alternative instrument is used as a method of payment for purchases on-site.

Prisons—the key is used for cell access and inmate tracking while the cash-alternative instrument is used as a method of payment on site.

Sports complexes—the key provides access to the gate and private suites while the cash-alternative instrument is used as a method of payment within the complex.

Shopping malls—the key provides access to the mall and private restaurants/suites and shopper tracking while the cash-alternative instrument is used as a method of payment on-site.

Throughout this application, various U.S. patents, patent applications, and PCT applications are referenced by number and inventor. The disclosures of these patents and applications in their entireties are hereby incorporated by reference into this specification in order to more fully describe the state of the art to which this technology pertains.

It is evident that many alternatives, modifications, and variations of the identity authentication device of the present invention will be apparent to those skilled in the art in light of the disclosure herein. It is intended that the metes and bounds of the present invention be determined by the appended claims rather than by the language of the above specification, and that all such alternatives, modifications, and variations which form a conjointly cooperative equivalent are intended to be included within the spirit and scope of these claims.

What is claimed is:

1. An identity authentication device having the general shape of a stylus, the stylus having a stylus tip, the identity authentication device comprising:

a sensor disposed within the grip of the stylus, the sensor enabling the capture of a fingerprint or a thumbprint as the stylus is generating text images upon a surface, either the fingerprint or thumbprint enabling identity authentication of the person doing the writing, the text images being a signature or non-signature images; and a processor having memory, the memory being disposed within the stylus, the stylus including means for determining the position of the tip of the stylus upon the surface, the text images being captured in processor memory as the writing is generated by the stylus, the processor memory retaining the text images generated by the stylus upon the surface;

whereby identity authentication is based upon a comparison of either the captured fingerprint or thumbprint against a reference print, such identity authentication being independent of the text images; and whereby the text images generated by the stylus are downloadable from the scanned text images retained in the processor memory within the stylus.

2. An identity authentication device having the general shape of a stylus, the identity authentication device comprising:

a sensor enabling the capture of a fingerprint or a thumbprint as the stylus is generating text images upon a surface, the fingerprint or thumbprint enabling identity authentication of a person doing the writing, the text images being a signature or non-signature images; and a processor having memory, the memory being disposed within the stylus, the stylus including a scanner-type device, the scanner-type device for scanning text images generated by the stylus upon the surface, all of the text images being captured in processor memory as the writing is generated by the stylus, the processor memory retaining the text images generated by the stylus upon the surface;

whereby identity authentication is based upon a comparison of either the captured fingerprint or thumbprint against a reference print, such identity authentication being independent of the text images; and whereby the text images generated by the stylus are downloadable from the scanned text images retained in the processor memory within the stylus.

3. An identity authentication device having the general shape of a stylus, the stylus having a stylus tip, the identity authentication device comprising:

a sensor enabling the capture of a fingerprint or a thumbprint as the stylus is generating text images upon a writing surface, the fingerprint or thumbprint enabling identity authentication of the person doing the writing, the text images being a signature or non-signature images; and a processor having memory, the memory being disposed within the stylus, the processor tracking the position of the stylus tip as the text images are being generated upon the writing surface, the position of the stylus tip relative to the surface being tracked by infrared emissions received by the stylus and stored in the processor memory as the writing is generated by the stylus;

whereby identity authentication is based upon a comparison of the captured fingerprint or thumbprint against a reference print, such identity authentication being independent of the text images; and whereby the text images generated by the stylus are downloadable from the scanned text images retained in the processor memory within the stylus.

* * * * *